UNITED STATES PATENT OFFICE 2,107,910

2,6-DIMETHYLNAPHTHALENE-1-SULPHONIC ACID AND A PROCESS OF PREPARING IT

Willy Schumacher, Frankfort-on-the-Main, Germany, assignor to General Aniline Works, Inc., New York, N. Y., a corporation of Delaware No Drawing. Application July 6, 1936, Serial No. 89,249. In Germany July 4, 1935

2 Claims. (Cl. 260—159)

The present invention relates to 2,6-dimethylnaphthalene-1-sulphonic acid and to a process of preparing it; more particularly it relates to a compound of the following formula:

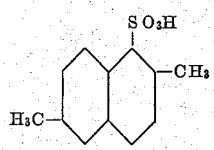

Three monosulphonic acids of 2,6-dimethylnaphthalene are theoretically possible; two have been prepared and described in literature, namely the 2,6-dimethylnaphthalene-8-sulphonic acid (cf. "Berichte der Deutschen Chemischen Gesellschaft", vol. 52, page 358) and the 2,6-dimethylnaphthalene-7-sulphonic acid (cf. ibid, vol. 52, page 355 and "Collect. Trav. chim. Tchecoslovaquie." 4. 21–31, Jan. 1932). The sulphonation of the 2,6-dimethylnaphthalene mentioned in German Patent No. 301,079, dated, August 3, 1916, likewise only leads to the 2,6-dimethylnaphthalene-8-sulphonic acid or, by transformation, to the 2,6-dimethylnaphthalene-7-sulphonic acid.

The 2,6-dimethylnaphthalene-1-sulphonic acid, in which the sulphonic group stands in ortho-position to a methyl-group, has not hitherto been known. Weissgerber and Kruber mention is (in "Berichte der Deutscher Chemischen Gesellshaft", vol. 52, page 358), but they did not succeed in isolating it or preparing it.

Now I have found that the 2,6-dimethylnaphthalene-1-sulphonic acid is obtained with a good yield by causing a sulphonating agent to act for a short time only on molten 2,6-dimethylnaphthalene.

The compound thus obtained is a valuable intermediate product for the manufacture of dyestuffs. It may be transformed into the 2,6-dimethyl-1-naphthol melting at 113° C., for instance, by melting it with a caustic alkali.

The following examples serve to illustrate the invention, but they are not intended to limit it thereto, the parts being by weight:

1. 102 parts of cencentrated sulphuric acid or 98 parts of sulphuric acid monohydrate are caused to run, while stirring, within half-an-hour at a temperature of about 110–120° C. into 78 parts of melted 2,6-dimethylnaphthalene. Stirring is continued for about 5 to 10 minutes at the same temperature; after cooling, the mixture is diluted with about 1000 parts of water. The sulphonic acid obtained is then dissolved by heating, and the solution is filtered in order to eliminate a small amount of unsulphonated 2,6-dimethylnaphthalene. By addition of a small amount of sodium chloride, up to 1 per cent., the very sparingly soluble sodium salt of the 2,6-dimethylnaphthalene-7-sulphonic acid, a small proportion of which is also obtained is precipitated from the filtrate; by further addition of sodium chloride the sodium salt of the 2,6-dimethylnaphthalene-1-sulphonic acid is obtained with a good yield.

The sulphochloride of the 2,6-dimethylnaphthalene-1-sulphonic acid, which can be prepared in the usual manner from the sodium salt of the sulphonic acid and phosphorus pentachloride, melts at 116–117° C. By causing it to react with ammonia it can be transformed into the sulphamide, which melts at 124–125° C.

2. 78 parts of 2,6-dimethylnaphthalene are melted; 70 parts of chlorosulphonic acid are added drop by drop within 45 minutes at a temperature of 115° C. to 120° C., while stirring. Stirring is continued at the same temperature for about another 10 minutes and the sulphonation mixture is then diluted with about 1000 parts of water. The product is worked up as indicated in Example 1.

3. 75 parts of fuming sulphuric acid containig 20 per cent. of sulphuric anhydride are caused to run, while stirring, within half-an-hour into 78 parts of melted 2,6-dimethylnaphthalene at a temperature of 115° C. to 120° C. Stirring is continued at the same temperature for about another 5 minutes and the sulphonation mixture is then diluted with about 2000 parts of water. The product is worked up as indicated in Example 1.

I claim:

1. A process of preparing 2,6-dimethylnaphthalene-1-sulphonic acid which comprises causing a sulphonating agent to act for a period of up to about two hours on molten 2,6-dimethylnaphthalene.

2. The 2,6 - dimethylnaphthalene-1-sulphonic acid of the following formula:

forming a sulphochloride which melts at 116° C. to 117° C., and a sulphamide which melts at 124° C. to 125° C.

WILLY SCHUMACHER.